(12) United States Patent
Paek et al.

(10) Patent No.: US 8,316,296 B2
(45) Date of Patent: Nov. 20, 2012

(54) PHRASE GENERATION USING PART(S) OF A SUGGESTED PHRASE

(75) Inventors: Tim Paek, Sammamish, WA (US);
Bongshin Lee, Issaquah, WA (US); Bo Thiesson, Woodinville, WA (US); Gary Voronel, Seattle, WA (US); Julian James Odell, Kirkland, WA (US); Olilver Scholz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 772 days.

(21) Appl. No.: 12/243,638

(22) Filed: Oct. 1, 2008

(65) Prior Publication Data

US 2010/0083103 A1    Apr. 1, 2010

(51) Int. Cl.
 *G06F 17/00*    (2006.01)
(52) U.S. Cl. .......................... 715/271; 715/256; 715/261
(58) Field of Classification Search ................... 715/254, 715/257, 261, 271, 259; 707/765
See application file for complete search history.

(56) References Cited

U.S. PATENT DOCUMENTS

| | | | |
|---|---|---|---|
| 4,688,195 A | | 8/1987 | Thompson et al. |
| 5,559,945 A | | 9/1996 | Beaudet et al. |
| 5,708,829 A | | 1/1998 | Kadashevich et al. |
| 6,236,959 B1 | | 5/2001 | Weise |
| 6,411,950 B1 | * | 6/2002 | Moricz et al. ........................ 1/1 |
| 6,564,213 B1 | | 5/2003 | Ortega et al. |
| 6,766,069 B1 | | 7/2004 | Dance et al. |
| 6,859,908 B1 | | 2/2005 | Clapper |
| 7,149,550 B2 | | 12/2006 | Kraft et al. |
| 7,548,899 B1 | * | 6/2009 | Del Favero et al. .................. 1/1 |
| 2002/0087562 A1 | | 7/2002 | McAnaney et al. |
| 2004/0254928 A1 | * | 12/2004 | Vronay et al. ..................... 707/5 |
| 2005/0283473 A1 | | 12/2005 | Rousso et al. |
| 2006/0106769 A1 | | 5/2006 | Gibbs |
| 2006/0190436 A1 | * | 8/2006 | Richardson et al. .............. 707/3 |
| 2006/0259479 A1 | | 11/2006 | Dai |
| 2006/0265648 A1 | | 11/2006 | Rainists et al. |
| 2006/0293890 A1 | | 12/2006 | Blair et al. |
| 2007/0050351 A1 | | 3/2007 | Kasperski et al. |

(Continued)

OTHER PUBLICATIONS

Koenemann, et al., "A Case for Interaction: A Study of Interactive Information Retrieval Behavior and Effectiveness", Proceedings of the SIGCHI Conference on Human Factors in Computing Systems: Common Ground, Vancouver, British Columbia, Canada, Apr. 13-18, 1996, pp. 205-212.

(Continued)

*Primary Examiner* — Adam M Queler
*Assistant Examiner* — Howard Cortes
(74) *Attorney, Agent, or Firm* — Microsoft Corporation

(57) ABSTRACT

Real-time query expansion (RTQE) is a process of supplementing an original query with addition terms or expansion choices that are ranked according to some figure of merit and presented while users are still formulating their queries. As disclosed herein, phrases may be presented and one or more terms of a focused-on phrase may be pinned (as desirable to the user). Subsequent lists may be presented as a function of pinned terms and/or user input. In one embodiment, a placeholder may be substituted for one or more pinned terms if less than some predetermined threshold of phrases is able to be presented based upon the pinned terms and/or user input, and another list of phrases may be presented as a function of a query using fewer than all the pinned terms. The placeholder may allow out-of-index phrases to be formed, for example, based upon two or more phrases and/or terms input by the user.

20 Claims, 8 Drawing Sheets

U.S. PATENT DOCUMENTS

| | | |
|---|---|---|
| 2007/0050352 A1 | 3/2007 | Kim |
| 2007/0061317 A1 | 3/2007 | Ramer et al. |
| 2007/0157122 A1 | 7/2007 | Williams |
| 2007/0162422 A1 | 7/2007 | Djabarov |
| 2007/0168469 A1 | 7/2007 | Church et al. |
| 2007/0250795 A1 | 10/2007 | Park |
| 2007/0288433 A1 | 12/2007 | Gupta et al. |
| 2008/0065617 A1 | 3/2008 | Burke et al. |
| 2008/0086698 A1 | 4/2008 | Hellman et al. |
| 2009/0049010 A1 | 2/2009 | Bodapati |
| 2009/0055386 A1* | 2/2009 | Boss et al. .................. 707/5 |
| 2009/0282035 A1 | 11/2009 | Fedtke |

OTHER PUBLICATIONS

Lewis, et al., "Task-Centered User Interface Design", 1994, 190 pages.

Mackenzie, et al., "LetterWise: Prefix-based Disambiguation for Mobile Text Input", Proceedings of the 14th Annual ACM Symposium on User Interface Software and Technology, Orlando, Florida, 2001, pp. 111-120.

"Mobile Phones Could Soon Rival the PC as World's Dominant Internet Platform", IPSOS INSIGHT, Apr. 18, 2006, pp. 1-3.

"Query Expansion" http://faculty.washington.edu/efthimis/pubs/Pubs/qe-arist/QE-arist.html.

"T9 Translator" http://www.t9.com.

White, et al., "Examining the Effectiveness of Real-Time Query Expansion", Information Processing and Management: An International Journal, vol. 43, Issue 3, May 2007, pp. 1-33.

Wigdor, et al., "A Comparison of Consecutive and Concurrent Input Text Entry Techniques for Mobile Phones", Proceedings of the SIGCHI Conference on Human Factors in Computing Systems, vol. 6, No. 1, Vienna, Austria, Apr. 24-29, 2004, pp. 81-88.

Zhang, et al., "Mining Search Engine Query Logs for Query Recommendation", Proceedings of the 15th International Conference on World Wide Web, Edinburgh, Scotland, May 22-26, 2006, pp. 1039-1040.

Beaulieu, M. "Experiments with interfaces to support query expansion", Journal of Documentation, 1997, 53(1), 8-19.

Beaulieu, et al., Enquire Okapi Project. British Library Research and Innovation Report 17, 1997.

Church, et al., "Mobile Content Enrichment", Proceedings of the 12th International Conference on Intelligent User Interfaces, Jan. 28-31, 2007, Honolulu, Hawaii, USA, pp. 112-121.

Church, et al., "Mobile Information Access: A Study of Emerging Search Behavior on the Mobile Internet", ACM Transactions on the Web, vol. 1, No. 1, Article 4, May 2007, pp. 1-38.

Church, et al., "K-Best Suffix Arrays", Proceedings of NAACL HLT 2007, Companion Volume, Rochester, NY, Apr. 2007, pp. 17-20.

Church, et al., "Towards More Intelligent Mobile Search", Proceedings of the 19th International Joint Conference on Artificial Intelligence, Edinburgh, Scotland, 2005, 3 pages.

Church, et al., "The Wild Thing!", Proceedings of the ACL Interactive Poster and Demonstration Sessions, Ann Arbor, Jun. 2005, pp. 93-96.

Croft, et al., "I3R: A new approach to the design of document retrieval systems", Journal of the American Society for Information Science, 38(6), 389-404, 1987.

Cui, et al., "Probabilistic Query Expansion Using Query Logs", Proceedings of the 11th International Conference on World Wide Web, May 7-11, 2002, Honolulu, Hawaii, USA, pp. 325-332.

Dunlop, et al., "Predictive Text Entry Methods for Mobile Phones", Personal Technologies, 4 (2), 2008, pp. 1-10.

Fowkes, et al., "Interactive searching behavior: Okapi experiment for TREC-8. Proc. of the IRSG 2000 Colloquium on IR Research", 2000.

"Google Suggest" http://www.google.com/webhp?complete=1&hl=en.

Jon Louis Bentley, "Multidimensional Binary Search Trees Used for Associative Searching", Communications of the ACM, vol. 18, No. 9, Sep. 1975, pp. 509-517.

Jones, et al., "Sorting out Searching on Small Screen Devices", Proceedings of the 4th International Symposium on Mobile Human-Computer Interaction, 2002, pp. 81-94.

Kamvar, et al., "A Large Scale Study of Wireless Search Behavior: Google Mobile Search", Proceedings of the SIGCHI Conference on Human Factors in Computing Systems, Apr. 22-27, 2006, Montreal, Quebec, Canada, pp. 701-709.

Kamvar, et al., "The Role of Context in Query Input: Using contextual signals to complete queries on mobile devices",Proceedings of the 9th International Conference on Human Computer Interaction with Mobile devices and Services, Singapore, 2007, pp. 405-412.

Bast, et al., "Output-Sensitive Autocompletion Search", Retrieved at <<http://www.mpi-inf.mpg.de/~hannah/papers/autocompletion-spire.pdf>>, pp. 12.

Bast, et al., "Type Less, Find More: Fast Autocompletion Search with a Succinct Index", <<http://www.mpi-inf.mpg.de/~hannah/papers/BastWeber-SIGIR2006.pdf>>, SIGIR'06, Aug. 6-11, 2006, Retrieved at. Pages 8.

Bast, et al., "Efficient Interactive Query Expansion with Complete Search", Retrieved at <<http://delivery.acm.org/10.1145/1330000/1321560/p857-bast.pdf?key1=1321560&key2=3092839121&coll=GUIDE&dl=GUIDE&CFID=173658&CFTOKEN=43151220>>, CIKM'07, Nov. 6-8, 2007, pp. 857-860.

U.S. Appl. No. 12/140,279, filed Jun. 17, 2008, Paek et al.

U.S. Appl. No. 12/140,280, filed Jun. 17, 2008, Paek et al.

Restriction/Election cited in related U.S. Appl. No. 12/140,279 dated Apr. 28, 2011.

Reply to Restriction/Election cited in related U.S. Appl. No. 12/140,279 dated May 25, 2011.

Non-Final Office Action cited in related U.S. Appl. No. 12/140,279 dated Jun. 22, 2011.

Reply to Non-Final Office Action cited in related U.S. Appl. No. 12/140,279 dated Sep. 22, 2011.

Final Office Action cited in related U.S. Appl. No. 12/140,279 dated Dec. 9, 2011.

Non-Final Office Action cited in related U.S. Appl. No. 12/140,280 dated Dec. 27, 2010.

Reply to Non-Final Office Action cited in related U.S. Appl. No. 12/140,280 dated Mar. 28, 2011.

Final Office Action cited in related U.S. Appl. No. 12/140,280 dated May 11, 2011.

Reply to Final Office Action cited in related U.S. Appl. No. 12/140,280 dated Jul. 21, 2011.

Non-Final Office Action cited in related U.S. Appl. No. 12/140,280 dated Oct. 14, 2011.

Reply to Non-Final Office Action cited in related U.S. Appl. No. 12/140,280 dated Jan. 17, 2012.

"Effective Phrase Prediction", Arnab Nandi and H.V. Jagadish, ACM, VLDB 2007, Vienna, Austria, Copyright 2007, VLDB Endowment, ACM, 12 pages.

"Google Suggest", reprinted from the Internet at: http://www.google.com/webhp?complete=1&h1=en on Mar. 28, 2008, 1 pg.

"T9 Text Input", reprinted from the Internet at: http://www.t9.com, on Mar. 28, 2008, 1 pg.

Reply to Final Office Action cited in U.S. Appl. No. 12/140,279 dated Mar. 9, 2012, 13 pgs.

Final Office Action cited in U.S. Appl. No. 12/140,280 dated Apr. 26, 2012, 36 pgs.

"Hash table", taken from http://en.wikipedia.org/wiki/Hash_table, published 2004, 1 pg.

"Output-Sensitive Autocompletion Search", Holger Bast, Christian W. Mortensen and Ingmar Weber, Retrieved at <<http://mpi-inf.mpg.de/~hannah/papers/autocompletion-spire.pdf>>, 12 pgs. date: 2006.

Notice of Allowance cited in U.S. Appl. No. 12/140,279 dated Aug. 30, 2012, 13 pgs.

Reply to Final Office Action cited in U.S. Appl. No. 12/140,280 dated Jul. 26, 2012, 17 pgs.

\* cited by examiner

PHRASE GENERATION USING PART(S) OF A SUGGESTED PHRASE

BACKGROUND

Today, many computer-related applications help facilitate quicker and more accurate text entry. Auto-completion techniques are commonly used in text messaging applications on cellular telephones, for example, because a numeric keypad or keyboard on a telephone is relatively small and difficult to use. Similar techniques are also commonly used in internet search engines to display frequently entered terms and phrases. While current auto-completion techniques have improved accuracy and speed (as compared to inputting terms manually), there remains room for improvement. For example current auto-completion techniques offer a user limited flexibility in modifying a suggested phrase.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to a first aspect, a method for assisting a user in generating a phrase is provided. The method comprises presenting a list of phrases, where at least one phrase comprises more than one term. While a phrase is generally understood as meaning more than one term, as used herein, particularly with regard to certain aspects or embodiment, a phrase can include merely one term or more than one term. The method also comprises pinning fewer than all the terms in a focused-on phrase comprising more than one term and presenting a second list of phrases based upon the pinned terms. The second list of phrases may be presented, for example, based upon a query that retrieves phrases that are relevant to the pinned terms.

According to another aspect, a method for assisting a user in generating a phrase will systematically loosen the relevance of retrieved phrases, when fewer than some predetermined threshold of phrases is otherwise retrieved. The method comprises presenting a list of phrases, pinning one or more terms from the presented list, and conducting a search of phrases based upon the one or more pinned terms, where the pinned terms are substituted with a placeholder (e.g., wildcard) when fewer than a predetermined threshold of phrases is retrieved during the search. It will be appreciated that the placeholder may hold the spot of one or more terms. The method also comprises presenting a second list of phrases as a function of the phrases retrieved from the search.

According to another aspect, a system for assisting a user in generating a phrase is provided. The system comprises an acquisition component configured to obtain sets of phrases from one or more data sources, a focusing component configured to focus on a phrase obtained by the acquisition component, and a pinning component configured to pin one or more terms of the focused-on phrase, where the pinned terms are inserted in a character entry field. The system also comprises a substitution component configured to temporarily replace one or more pinned terms with a placeholder when a second set of phrases, obtained by the acquisition component, comprises fewer than a predetermined threshold of terms.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 4 illustrates an exemplary user interface after a phrase in a list of phrases is focused on.

FIG. 5 illustrates an exemplary user interface after a first term is pinned and a phrase from a subsequent list is focused on.

FIG. 9 illustrates an exemplary user interface after terms are pinned and a phrase from a subsequent list is focused on.

DETAILED DESCRIPTION

Figure 1:
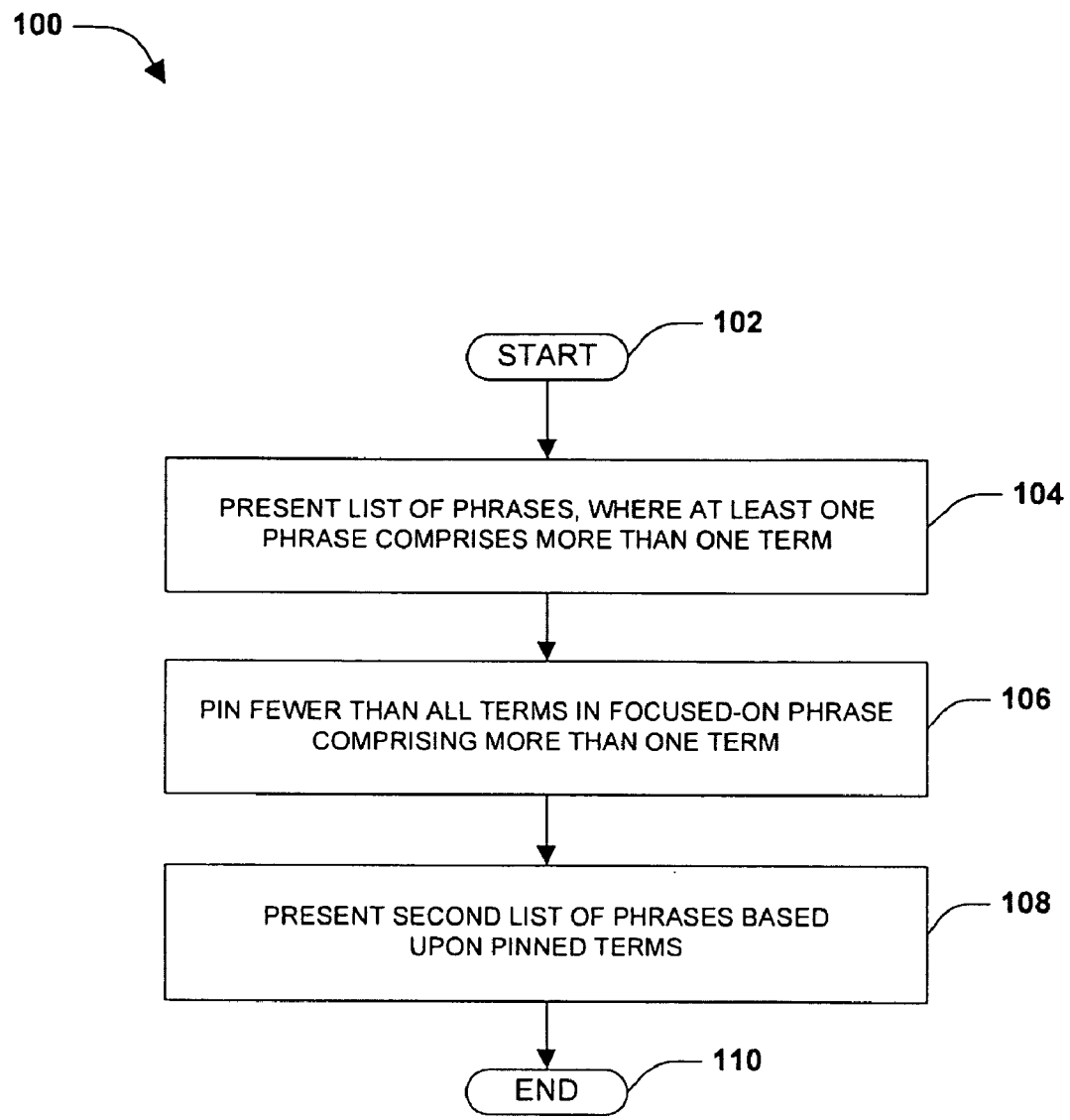
FIG. 1 is a flow chart illustrating an exemplary method of assisting a user in generating a phrase.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Turning initially to FIG. 1, an exemplary methodology 100 is illustrated for assisting a user in generating a phrase using real-time query expansion (RTQE). In one example, the phrases can be so constructed and used for entering a query into a handheld device, such as a cellular telephone, for example. The method 100 begins at 102, and a list of phrases is presented at 104. At least one phrase in the list comprises more than one term. A term, as used herein, might include a word, number, or symbol, for example, and a phrase might comprise one or more terms. The list of phrases may be presented when the user opens a character entry application and/or when the user inputs text into a character entry field of the character entry application. A character entry application, for example, may be part of and/or used in conjunction with a text messaging application, a search engine application, and/or another application that commonly uses auto-completion functionality, for example.

The presented phrases may be retrieved from a plurality of data sources. For example, phrases may be retrieved from an internet source that comprises phrases that are commonly entered in a search engine, a dictionary of phrases internal to a device the character entry application is operating on (e.g., a cellular telephone), and/or a source that saves phrases the user previously entered in the character entry application. In one example, graphical representations are used to indicate the source of the retrieved phrases. For example, icons, similar to those used in desktop applications to represent various file formats, may be used to represent the sources of the phrases.

The list of phrases may be arranged according to some figure of merit. One example of a figure of merit may comprise a consideration of the popularity of one or more phrases (e.g., relative to some context of interest). For example, the phrases may be arranged according to how frequently the phrase is used by the user in the character entry application and/or how frequently the phrase is used by others to conduct a search.

In one embodiment, the phrases are presented as a function of one or more characters input into the character entry field. The phrases presented in the list may comprise terms that begin with the one or more characters entered into the character entry field. In one example, the user may select whether the presented phrases include phrases that begin with the character(s) entered (e.g., the location of the character(s) in the character entry field correspond to the location of the character(s) in the phrase) or whether presented phrases comprise a term that begins with the character(s) entered. For example, if a user types "sp," a user may designate whether the presented phrases include only phrases that begin with "sp" or whether the presented phrases may also include phrases that have a second, third, etc., term that begins with "sp." It will be appreciated that the character(s) in a term that match the character(s) input by the user and/or the term that includes the character(s) may be presented in some distinguished manner (e.g., bold, underlined, highlighted, etc.).

At 106, fewer than all the terms in the focused-on phrase comprising more than one term are pinned. A phrase in the list may be focused on by default (e.g., the phrase having the highest figure of merit, the most popular phrase in the list, etc.) or by user input. To focus on other than a default phrase, a user may scroll to a different phrase in the list.

The term "pinned" is used in a broad sense herein to comprise, among other things, one or more terms that are comprised in the focused-on phrase and are selectively added to the phrase being generated or otherwise chosen based upon the occurrence of some predetermined event. A predetermined event might include, for example, the user pressing a d-pad (on a cellular telephone) to the right and/or the user focusing on the phrase such that one or more terms in the phrase are automatically pinned as a function of characters in the character entry field. In one example, the pinned terms include a term that comprises characters entered into the character entry field and terms that precede that term. Terms capable of being pinned may be presented in a distinctive manner. For example, the one or more terms may be underlined in the list and/or parts of those terms that are not in the character entry field may appear in phantom (e.g., a lighter font color) in the character entry field.

At 108, a second list of phrases is presented based upon the pinned terms. In one example, the pinned terms are used to conduct a query of data sources (similar to those used to retrieve the list of phrases at 104) to retrieve phrases that are more relevant (than the previously presented phrases), based upon the pinned terms. It will be appreciated that fewer than all of the pinned terms may be used to conduct a query of the one or more sources. In one example, a placeholder may be used to temporarily represent the one or more pinned terms not used to conduct a query (and the placeholder may be replaced by those one or more pinned terms prior to presenting the second list of phrases).

In one embodiment, the phrases presented in the second list are presented in phrases that comprise at least one of the pinned terms, but may, in one example, include all of the pinned terms. For example, the phrases may have common first and second terms if the first and second terms were pinned in a previously presented list (and the terms retrieved at 108 may be appended to the first and second term so as to cause unique phrases based upon the third, fourth, etc. terms).

A subsequent list of phrases may be presented if additional terms, for example, from the second list are pinned. A subsequent list of phrases may also be presented based upon user input. For example, if a desired phrase is not presented in the second list of phrases, the user may input characters into the character entry field (and a query may be conducted based upon one or more of the pinned terms and/or the user input), and a subsequent list of phrases may be presented. It will be appreciated that subsequent lists may continue to be presented to the user, additional phrases may be focused on, and terms may be pinned until the desired phrase is generated. It will also be appreciated that a user may add and/or delete a character from one or more pinned terms and list of phrases may be presented based upon the remaining pinned terms and/or user input.

Once a desired phrase has been generated (as a function of the pinned terms and/or user input), the user may select the generated phrase. The selected phrase may be inserted into an SMS text message box and/or input into a search field text box, such as on an internet application, for example. The method 100 ends at 110.

Figure 2:
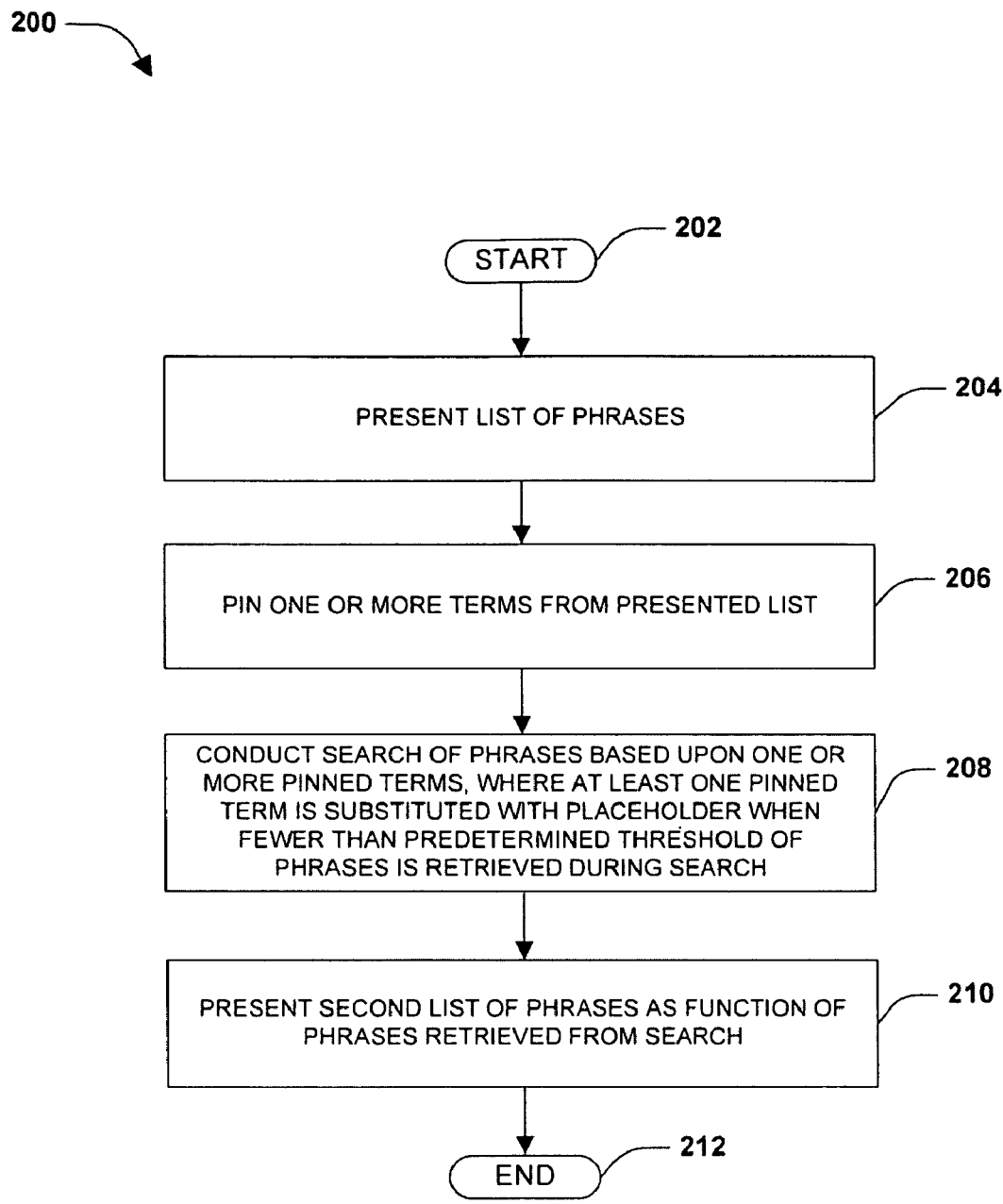
FIG. 2 is a flow chart illustrating an exemplary method of assisting a user in generating a phrase.

FIG. 2 illustrates another exemplary method 200 for assisting a user in generating a phrase when fewer than some predetermined threshold of terms is retrieved in a list of phrases. The method 200 begins at 202, and a list of phrases is presented at 204. It will be appreciated that a phrase may comprise one or more terms. The list may be presented, for example, when the user opens an application that comprises a character entry application and/or when the user enters characters into a character entry field. In one example, characters entered into a character entry field are used to conduct a query of data sources (similar to those used to retrieve relevant phrases at 104), and the presented phrases are phrases that relate to the entered characters (e.g., begin with the entered characters, comprise the characters entered, etc.). The presented phrases may be ranked according to some figure of merit, such as the phrases popularity relative to other phrases in the list (e.g., according to how often the user uses the phrase and/or how often others use the phrase).

At 206, one or more terms from the presented list are pinned. A user may pin one or more terms by focusing on a phrase in the list (e.g., comprising the desired term(s)) and moving right (e.g., using a d-pad on a cellular telephone), for example, and/or designating the term(s) in some other manner (e.g., hitting enter or another key on a keyboard). It will be appreciated that a term or terms capable of being pinned may be displayed in some distinguished manner (e.g., highlighting, underlining, etc.). Distinguishing terms capable of being pinned may be useful, for example, where a phrase is focused on and fewer than all terms in the phrase may be pinned if the user moves right, for example.

At 208, a search of phrases is conducted based upon one or more pinned terms. Pinned terms may be substituted with a placeholder (e.g., a wildcard) when fewer than a predetermined threshold of phrases matching the full set of pinned terms is retrieved during the search. The placeholder may act as a marker to hold the spot of one or more terms that are removed prior to a query being conducted. For example, if the pinned terms are in series (e.g., forming the beginning portion of a phrase), a placeholder may be inserted for one or more terms in the series so that a query may be conducted on a limited portion of the series (e.g., causing the scope of the query to be expanded).

In one embodiment, the placeholder initially replaces a term further to the left of other terms (in a character entry field) and continues to replace additional terms further to the left (relative to other remaining terms in the character entry field) until a predetermined threshold of phrases is retrieved during the search. For example, suppose "green tea ice" is presented in the character entry field. If a query is conducted based upon "green tea ice" and fewer than some predetermined threshold of phrases is retrieved, the term "green" may be replaced with a placeholder. A query may be conducted based upon "* tea ice" and/or "*tea ice (where the "*" represents the placeholder), and phrases that include zero or more characters precedent to the terms "tea ice" may be retrieved. If fewer than some predetermined threshold of phrases is retrieved, a query may be conducted based upon "* ice" and/or "*ice". This technique, for example, may allow for improved use of data sources (particularly if the phrases comprised in the data sources are limited as a function of storage capacity) by retrieving phrases based upon less than all of the pinned terms. It also improves the likelihood that at least one phrase is retrieved from the data source regardless of the terms in the character entry field (as compared to other auto-completion techniques).

Conducting searches using a placeholder may allow out-of-index phrases (e.g., phrases not stored in the data source(s)) to be created as a function of phrases that are stored in the data source(s). That is, one or more terms of each of two or more phrases in the data source(s) may be combined to form a phrase that is not in the data source(s). For example, the user may want to generate the phrase, "this is a test of the American broadcast system." While this phrase may not be in the data source(s), it may be constructed based upon two phrases ("this is a test of your knowledge" and "the American broadcast system is sounding"), for example. The user may pin the terms "this is a test of" and insert the characters "the Ame" thereafter, for example, and a search may be conducted based upon "* Ame" and/or "*Ame" (if less than a predetermined threshold of phrases were retrieved when the placeholder replaced less than all the pinned terms). The search may cause the phrase "the American broadcast system is sounding" to be retrieved and appended to the pinned terms "this is a test of the." The phrase "this is a test of the America broadcast system is sounding," may be presented to the user, and the user may pin the terms "American broadcast system," to generate the phrase "this is a test of the American broadcast system." It will be understood to those skilled in the art that as long as the phrases that comprise the desired phrase are in the database, and individual terms are capable of being pinned, the phrase may be generated compositionally. Moreover, the user may manually enter one or more terms that are not already in the data source(s) to arrive at the desired phrase.

It will be appreciated that phrases that are generated by combining multiple in-index phrases (e.g., "this is a test of the American broadcast system"), but are not initially stored in the data source(s) may be added to the data source(s). Alternatively, fewer than all of the generated phrase may be stored in the data source(s) (e.g., where memory is scarce). For example, terms the user manually enters because the terms are not already stored in the data source(s) (e.g., out-of index terms) may be added to the data source(s) to become in-index terms/phrases, but terms in the phrase that are already stored in the data source(s) (individually or as part of a phrase of two or more terms) may not be stored in the data source(s) again. Limiting storage to those terms that are not already in the data source(s) may for example, reduce the amount of memory used by the data source(s) (which may be particularly desirable where memory may be limited such as in a cellular telephone, for example).

At 210, a second list of phrases is presented as a function of phrases retrieved from the search at 208. In one embodiment, the phrases presented in the second list commonly share the terms pinned at 206. For example, "green tea ice" may be presented to the left of the phrases retrieved at 208 (e.g., the first three terms of the phrases presented in the second list are "green tea ice"). If a placeholder was substituted for one or more pinned terms, the placeholder may be replaced with the pinned terms it was substituted for prior to being presented to the user.

It will be appreciated that user input may also be received and a search may be conducted (at 208) based upon one or more pinned terms and the text input by the user. For example, if a desired phrase is not presented to the user in the second list, a user may input additional text into the character entry field, and a search may be conducted based upon the pinned terms and the additional text. In one embodiment, the placeholder may replace both pinned terms and user input so that a predetermined threshold of phrases is retrieved. That is, the user input may be treated similarly to terms pinned from a previously presented list of phrases (e.g., the phrases presented at 204). For example, if "green tea" is pinned and the user inputs "ice c" into the character entry field after the pinned terms, a placeholder may be substituted for "green tea ice" (e.g., conducting a search using the search term "* c" where this includes the "space" before the "c"). Additionally, the placeholder may substitute characters (including terms and spaces) up to the term boundary of the last term (e.g., the last or rightmost space in the character entry field). In the example above, if still more phrases are preferred to achieve a predetermined threshold, a placeholder may be substituted for "green tea ice", using the search term "*C". While substituting characters up to the term boundary of the last term is not preferred, it promotes the likelihood that at least one phrase will be retrieved (and will in practicality return many results since merely the letter c, for example, will be searched and thus many results beginning with the letter c will be returned). That is, the characters preceding the term boundary of the last term serve as predictors of upcoming terms and when the placeholder is substituted for characters preceding the term boundary of the last term, the predictions are less accurate (e.g., relying solely on the popularity of terms that begin with the character "c").

The techniques disclosed herein may be used to present subsequent lists to the user until a desired phrase is generated. When the desired phrase is generated, the user may select the phrase, causing the phrase to be input into a desired field (e.g., an SMS text message, an internet website, etc.). The method 200 ends at 212.

By way of example, FIGS. 3-7 demonstrate at least some of the advantages of generating a phrase using the techniques disclosed herein (e.g., as provided in FIGS. 1 and 2). More particularly, FIGS. 3-7 illustrate a display 300, a character entry application 302, a character entry field 304, and a field for displaying lists of phrases 306.

Figure 3:
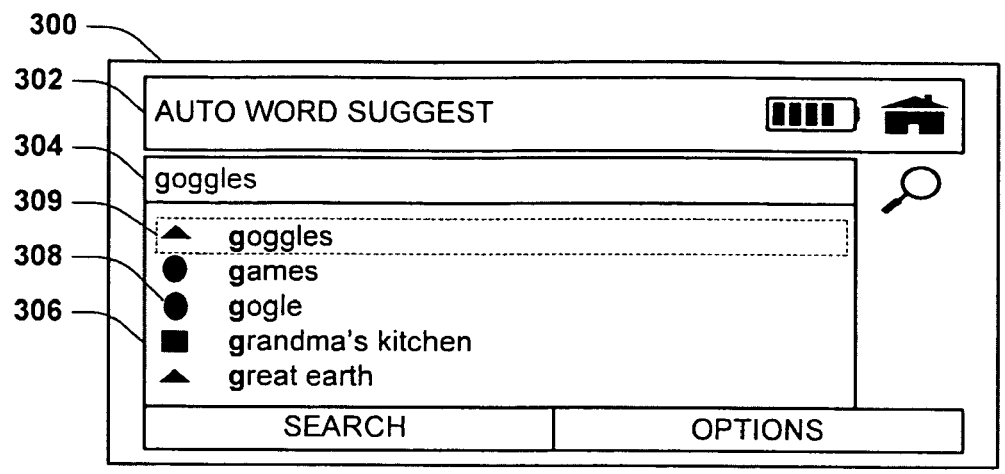
FIG. 3 illustrates an exemplary user interface after a first character is input into the character entry field.

A user may use the techniques, for example, to generate the phrase "green tea ice." In FIG. 3, the user inputs the character "g" into the character entry field 304 and a list of phrases that begin with "g" is presented to the user in the field for displaying lists of phrases 306. It will be appreciated that phrases may also be presented prior to user input. The character(s) in a phrase on the list that correspond to the character(s) in the character entry field 304 may be represented in a distinctive manner (e.g., bold font, highlighting, underlining, etc.). This may, for example, assist a user in determining which term(s) may be pinned (if the user moves right). It will also be appreciated that a phrase in the list may be focused on by default. In the illustrated example, the phrase "goggles" 309 is focused on by default.

The phrases may be ordered according to some figure of merit, for example, such as how popular the phrase is relative to other phrases. It will be appreciated that the number of phrases retrieved and/or presented may be a function of the available area on the display 300, and phrases presented may be those with a higher figure or merit, relative to those not retrieved and/or presented. For example, fewer phrases may be presented in a display on a cellular telephone (with a relatively small screen) than on a computer display.

Graphical representations 308 corresponding to the source of a phrase may also be presented. For example, the graphical representations 308 may indicate that the phrase was retrieved from an internal dictionary, an internet source, etc. It one example, a graphical representation 308 may be selected and additional phrases from the source represented by the graphical representation 308 may be retrieved.

Figure 4:
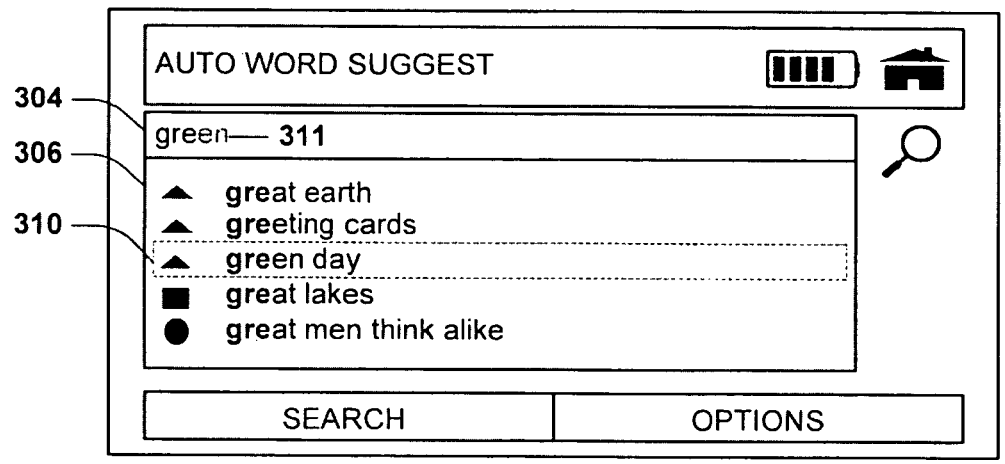

As illustrated in FIG. 4, the user may continue to input characters into the character entry field 304 until a desired term ("green") appears in the field for displaying lists of phrases 306. If the desired term(s) appears, the user may focus on the phrase comprising the desired term(s) and pin the term(s). In the illustrated example, the user focuses on "green day" 310 and pins "green" (e.g., by moving right on a d-pad on a cellular telephone). In one example, the part of the term that would be pinned (if the user moves right), but has not been typed yet (e.g., "en"), may be displayed in phantom 311 in the character entry field 304 when the user focuses on the phrase.

Figure 5:
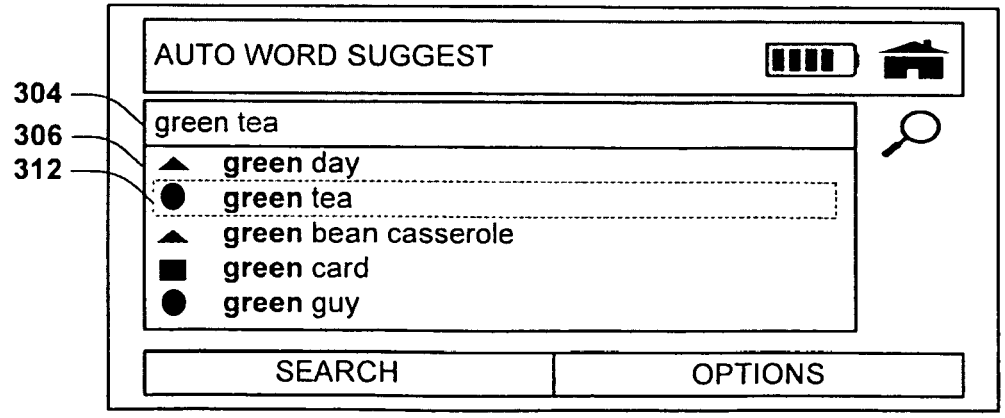

As illustrated in FIG. 5, the pinned term(s) may appear in the character entry field 304 and another list of phrases (more relevant as a function of a search conducted based upon the pinned term "green") may appear in the field for displaying lists of phrases 306. In the illustrated example, phrases that begin with "green" are retrieved from data sources. If additional terms of the desired phrase are presented (e.g., a desired next term in the phrase), the phrase comprising the desired next term may be focused on. In FIG. 5, the user focuses on "green tea" 312 and pins the term "tea" (since "green" was already pinned).

Figure 6:
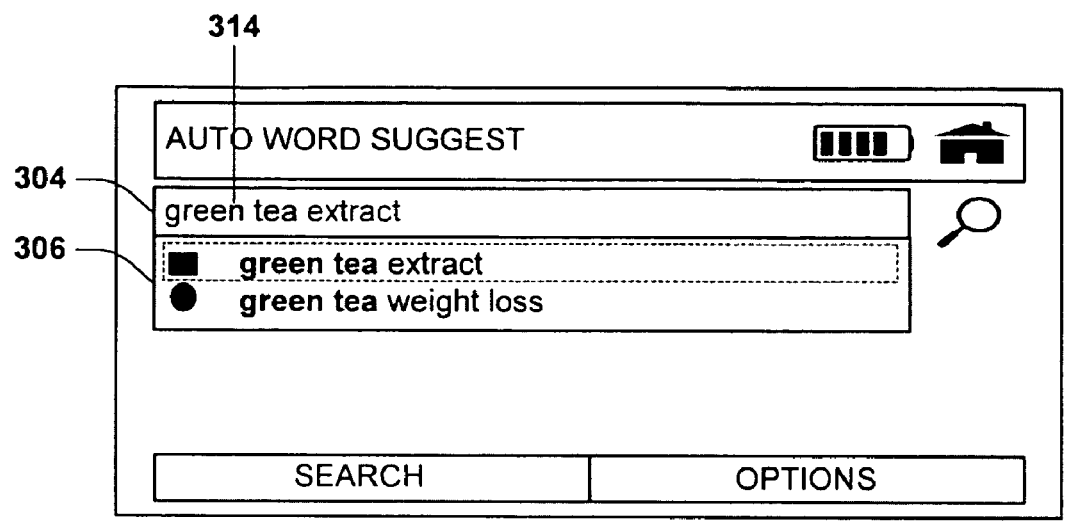
FIG. 6 illustrates an exemplary user interface after two terms are pinned and subsequent list of phrases is presented.

In FIG. 6, the term "tea" 314 is added to the character entry field 304 and another list of phrases (more relevant as a function of a search conducted based upon the terms "green tea") appears in the field for displaying lists of phrases 306. If the phrases presented do not assist the user in generating the desired phrase, the user may enter additional text into the character entry field, causing the list of phrases in the field for displaying lists of phrases 306 to change.

Figure 7:
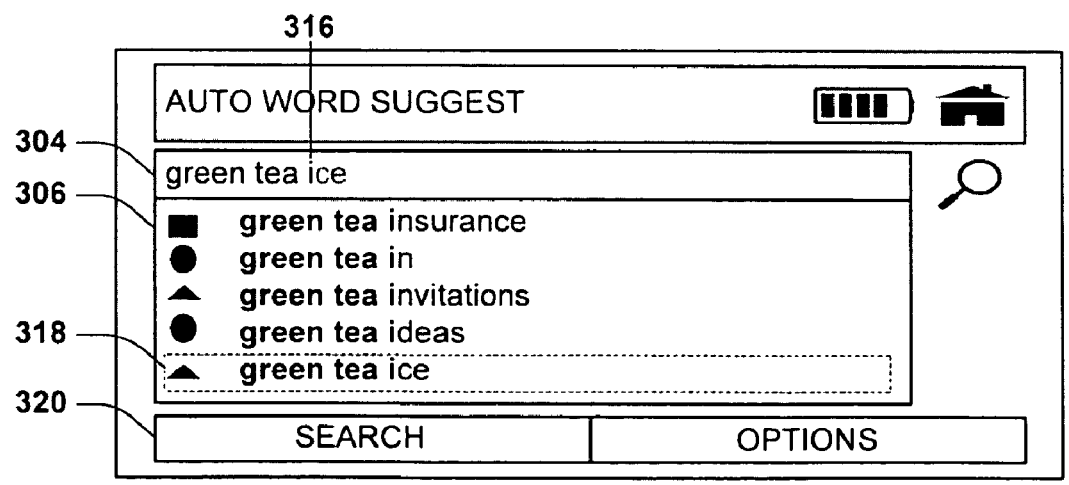
FIG. 7 illustrates an exemplary user interface after user input is received and a placeholder is substituted for one or more pinned terms.

In FIG. 7, the user inputs the character "i" 316 after pinned terms "green tea" in the character entry field 304 and another list of phrases appears in the field for displaying lists of phrases 306. Referring back to FIG. 6, two phrases were retrieved based upon a search of the terms "green tea" and neither of the two matching phrases comprised "green tea i" (so no results would be returned if a search were conducted based upon the terms "green tea i"). To retrieve terms relevant to at least a portion of the terms/characters in the character entry field 304, a placeholder may be substituted for one or more of the terms in the character entry field 304, and terms relevant to the remaining portion of the terms/characters in the character entry field 304 may be retrieved. For example, the placeholder may replace the term "green" and a search may be conducted based upon the phrase "* tea i" and/or "*tea i." If fewer than some predetermined threshold of terms appear based upon a search of "* tea i" and/or "*tea I," the placeholder may substitute for "green tea" and a search based upon "* i" may be conducted. If still more phrases are needed, the placeholder may finally substitute for "green tea " (with a "space" after the word "tea") and a search based upon "*i" may be conducted.

In the illustrated example, the phrases retrieved are appended to the terms that are pinned in the character entry field (so that the field for displaying lists of phrases 306 comprises phrases that include the pinned terms). For example, if "chocolate ice" was found as a match to "* i", it appends "ice" to "green tea" to generate the phrase "green tea ice" (even if that phrase was not in the sources). The user may focus on a desired phrase and pin the next term (e.g., the user may focus on the phrase "green tea ice" 318 and pin the term "ice").

When the desired phrase is generated (e.g., "green tea ice"), the phrase may be inserted into a desired location (e.g., search engine field, a text message, etc.). In the illustrated example, the generated phrase is inserted into a desired location when a "search" button 320 is selected.

Figure 8:
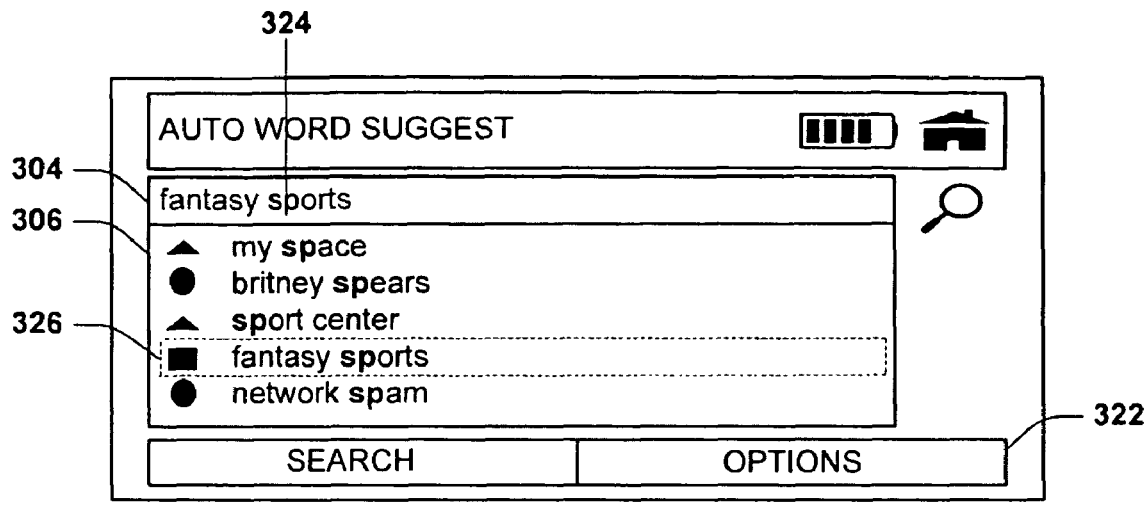
FIG. 8 illustrates an exemplary user interface after match anywhere functionality is turned on and user input is received.
Figure 9:
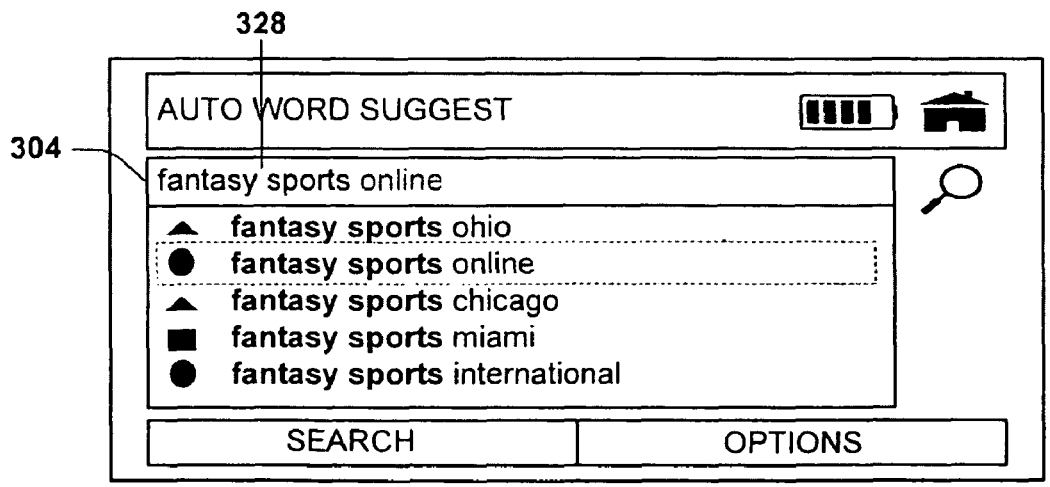

FIGS. 8-9 illustrate additional features and capabilities for generating a phrase using the techniques disclosed herein. More particularly, FIGS. 8-9 illustrate a match-anywhere functionality. In the illustrated example, match-anywhere functionality is enabled when a user selects the "options" button 322 and enables a "match-anywhere" option comprised in a pop-up window, for example, that opens when the "options" button 322 is selected. Match-anywhere functionality may allow phrases that include a term that matches characters entered into the character entry field to be presented, even if the term is not the first term in the phrase, for example.

As illustrated in FIG. 8, the user inserts the characters "sp" 324 in the character entry field 304, and phrases that comprise "sp" are presented in the field for displaying lists of phrases 306. Since match-anyway functionality is enabled, phrases that do not begin with "sp" may also be displayed in the field for displaying lists of phrases 306. The user may scroll to a desired phrase (e.g., "fantasy sports" 326) and pin one or more terms. In the illustrated example, terms precedent to and including the term that comprises "sp" are pinned (when the user moves right). It will be appreciated that the user may also just pin the term "sports" (e.g., ignoring the term "fantasy").

In FIG. 9, the pinned terms "fantasy sports" 328 are displayed in the character entry field 304 and additional phrases are suggested as a function of a search of data sources based upon the terms "fantasy sports." It will be appreciated that lists may continue to be presented as a function of pinned terms and/or input characters until the desired phrase is generated. The phrase may then be inserted into a location specified by the user.

Figure 10:
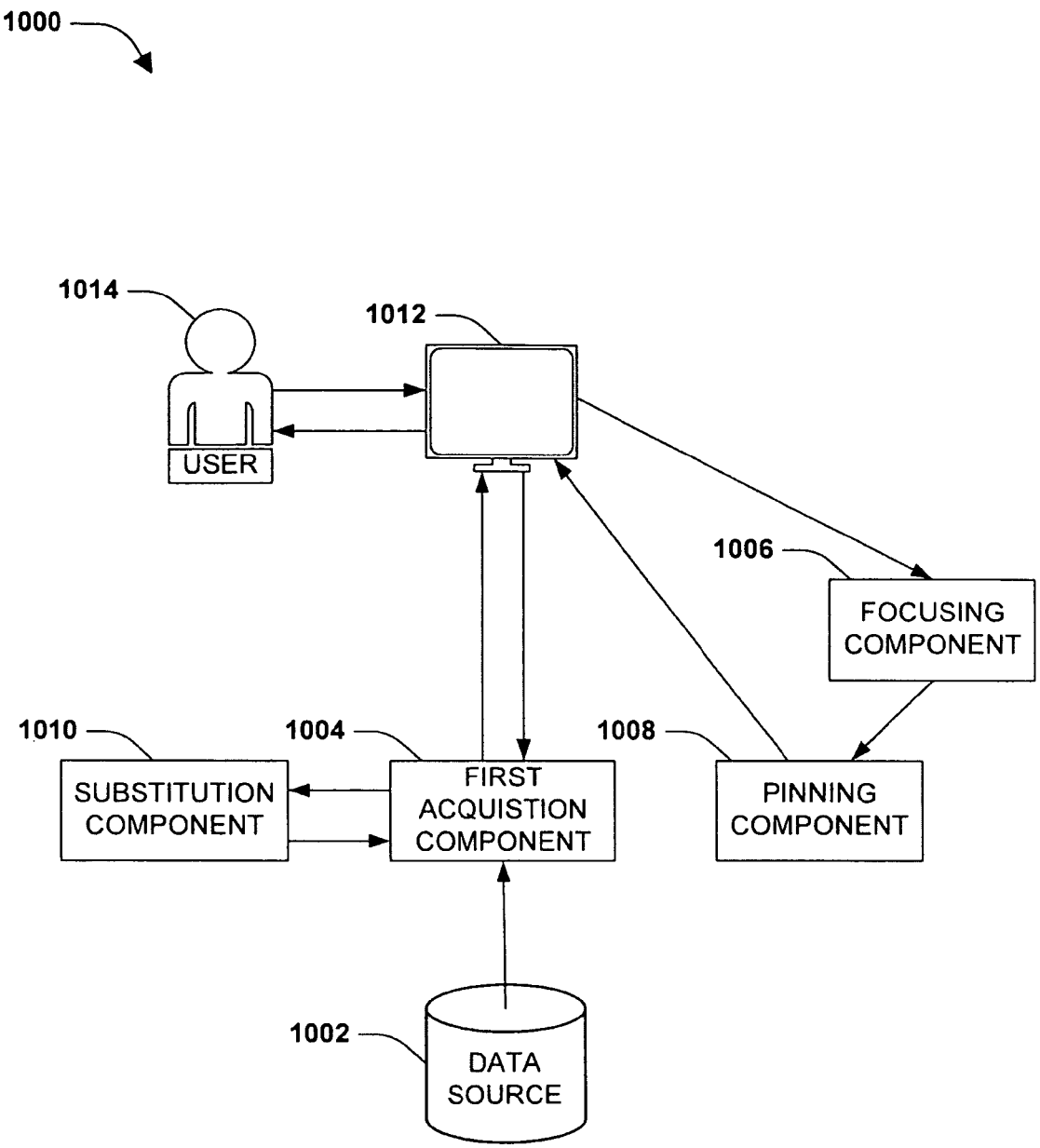
FIG. 10 is a component block diagram illustrating an exemplary system for assisting a user in generating a phrase.

FIG. 10 is a schematic block diagram of an exemplary system 1000 configured to assist a user in generating a phrase. The system comprises an acquisition component 1004 configured to obtain phrases from one or more data sources 1002, a focusing component 1006 configured to focus on a phrase obtained by the acquisition component; a pinning component 1008 configured to pin one or more terms of the focused-on phrases, and a substitution component 1010 configured to temporarily replace one or more pinned terms with a placeholder when a second and/or subsequent set of phrases, obtained by the acquisition component, comprises fewer than a predetermined threshold of phrases. In one embodiment, the system 1000 is implemented on a cellular telephone and/or another device capable of receiving user input and displaying the data to a user 1014.

The acquisition component 1004 obtains a first set of phrases from one or more data sources 1002 upon the occurrence of a predetermined event (e.g., a character entry application is opened and/or user input is received in the character entry field of a character entry application). In one embodiment, the acquisition component 1004 obtains phrases that are more relevant (relative to other terms in the data sources 1002) based upon phrases that are more popular to the user (determined as a function of phrases previously selected by the user). Phrases may also be more relevant, for example, based upon user input received into the character entry field of the character entry application. The phrases obtained by the acquisition component 1004 may be displayed to the user 1014 on a display 1012.

The focusing component 1006 focuses on a phrase from the first set of phrases obtained by the acquisition component 1004. The focusing component 1006 may focus on a phrase by default and/or focus on a phrase based upon user input. If a phrase is focused on by default, the user may focus on a different phrase by scrolling through the set of obtained set of phrases. It will be appreciated that the focusing component 1006 may present the focused-on phrase to the user 1014 in a distinguished manner (e.g., highlighting, underlining, etc.).

The pinning component 1008 pins one or more terms of the focused-on phrase by the focusing component 1006 and inserts the pinned term(s) into the character entry field. In one example, the pinning component 1008 automatically pins a term that is further to the left of other terms in a focused-on phrase that have not been pinned. For example, if "I like" has already been pinned and a user focus on a phrase that reads "I like football games," the pinning component 1008 may automatically pin "football" after the phrase has been focused on for five seconds. In another example, the pinning component 1008 pins a term as a function of user input (e.g., the user touches the right arrow key on a d-pad on a cellular telephone). In one embodiment, the pinning component 1008 indicates to the user 1014 which term will be pinned from the focused-on phrase (e.g., by displaying the term in phantom in the character entry field and/or underlining the term).

The acquisition component 1004 obtains a second and/or subsequent set of phrases from the one or more data sources 1002 as a function of the pinned terms and/or other user input into the character entry field. In one example, the acquisition component appends the obtained terms to the pinned terms to form phrases. The second and/or subsequent set of phrases is displayed to the user 1014, and the focusing component 1006 focuses on a phrase from the second and/or subsequent set of phrases. The pinning component 1008 may pin a term from the focused-on phrase and/or the user 1014 may select a phrase (causing the acquisition component 1004 to not obtain a third set of phrases).

The substitution component 1010 is configured to temporarily replace one or more pinned terms with a placeholder when a set of phrases comprises fewer than a predetermined threshold of phrases so that the acquisition component 1004 may obtain another set of phrases as a function of less than all the pinned terms in the character entry field. For example, the character entry field may comprise the phrase "green tea ice" and the acquisition component 1004 may attempt conduct a query of the one or more data sources 1002 to obtain phrases relevant to that phrase. If fewer than a predetermined threshold of phrases is obtained by the acquisition component 1004, the substitution component 1010 may substitute "green" with a placeholder so that phrases relevant to "tea ice" may be obtained, for example. If still fewer than a predetermined threshold of phrases is obtained, the substitution component 1010 may substitute "green tea" with a placeholder so that phrases relevant to "ice" may be obtained: In one example, the substitution component 1010 reinserts the substituted terms in the spot marked by the placeholder when the acquisition component 1004 obtains at least a predetermined threshold of phrases. This may, for example, allow the pinned terms to be displayed with the phrases obtained by the acquisition component 1004 (such that the terms from the obtained phrases are appended to the pinned terms). In another example, the substitution component replaces the terms that cannot be part of the desired phrase with the pinned terms. For example, the acquisition component 1004 may obtain the phrase "vanilla ice cream," and the substitution component 1010 may replace "vanilla ice" with "green tea ice" since the terms "green tea ice" have already been pinned.

It will be understood to those skilled in the art that substituting one or more terms with a placeholder (e.g., a wildcard) may allow out-of-index phrases to be generated. That is, phrases may be generated that are based upon one or more phrases in the data sources 1002 as well as terms manually input by the user (e.g., because they were out-of-index). This may, for example, reduce the number of phrases that need to be stored in the data sources 1002. For example, "green tea ice cream" may not be stored in the data source 1002, but the phrases "green tea" and "vanilla ice cream" may be stored in the data sources 1002. The phrase "green tea ic," for example may be inserted into the character entry field (through pinning and/or user input), and a query may be conducted to retrieve phrases that comprise "green tea ic." If less than some predetermined threshold of phrases is retrieved, a placeholder may be inserted for one or more of the terms. If the placeholder replaces "green tea", for example, a query may be conducted based upon "* ic" and/or "*ic," and the phrase "vanilla ice cream" may be retrieved. The substitution component 1010 may replace "vanilla" with "green tea," since the placeholder represents terms that are precedent to "ic" (e.g., "green tea").

It will be appreciated that the phrase generated by the user may be stored in the data sources 1002. For example, the phrase "green tea ice cream" may be stored in the data sources 1002 so that it may be obtained more quickly (relative to generating the phrase through pinning and/or user input) in future queries by the acquisition component 1004. It will also be appreciated that the data sources 1002 may limit which terms in a phrase are added to the data sources 1002. In one example, terms added to the data sources 1002 are those that are not already in the data sources (individually or as part of a phrase of more than one term). That is, out-of-index terms become in-index terms by adding them to the data sources 1002. Limiting the terms added to the data sources 1002 may reduce the amount of storage space used on a device with limited storage capacity, such as a cellular telephone, for example.

Figure 11:
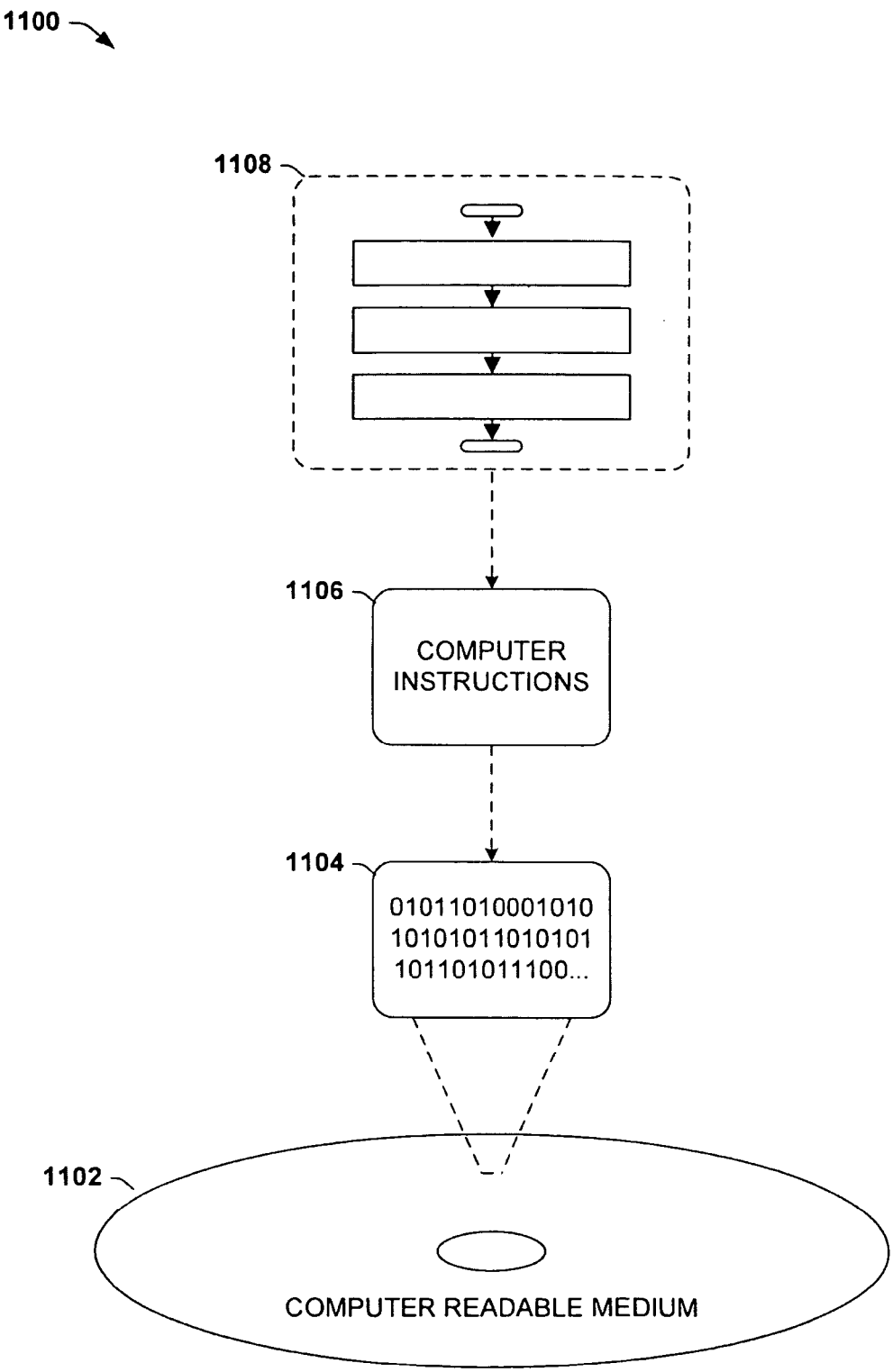
FIG. 11 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 11, wherein the implementation 1100 comprises a computer-readable medium 1102 (e.g., a CD-R, DVD-R, or a platter of a hard disk drive), on which is encoded computer-readable data 1104. This computer-readable data 1104 in turn comprises a set of computer instructions 1106 configured to operate according to one or more of the principles set forth herein. In one such embodiment 1100, the processor-executable instructions 1106 may be configured to perform a method, such as the exemplary methods 100 of FIG. 1 or 200 of FIG. 2, for example. In another such embodiment, the processor-executable instructions 1106 may be configured to implement a system, such as the exemplary system 1000 of FIG. 10, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 12:
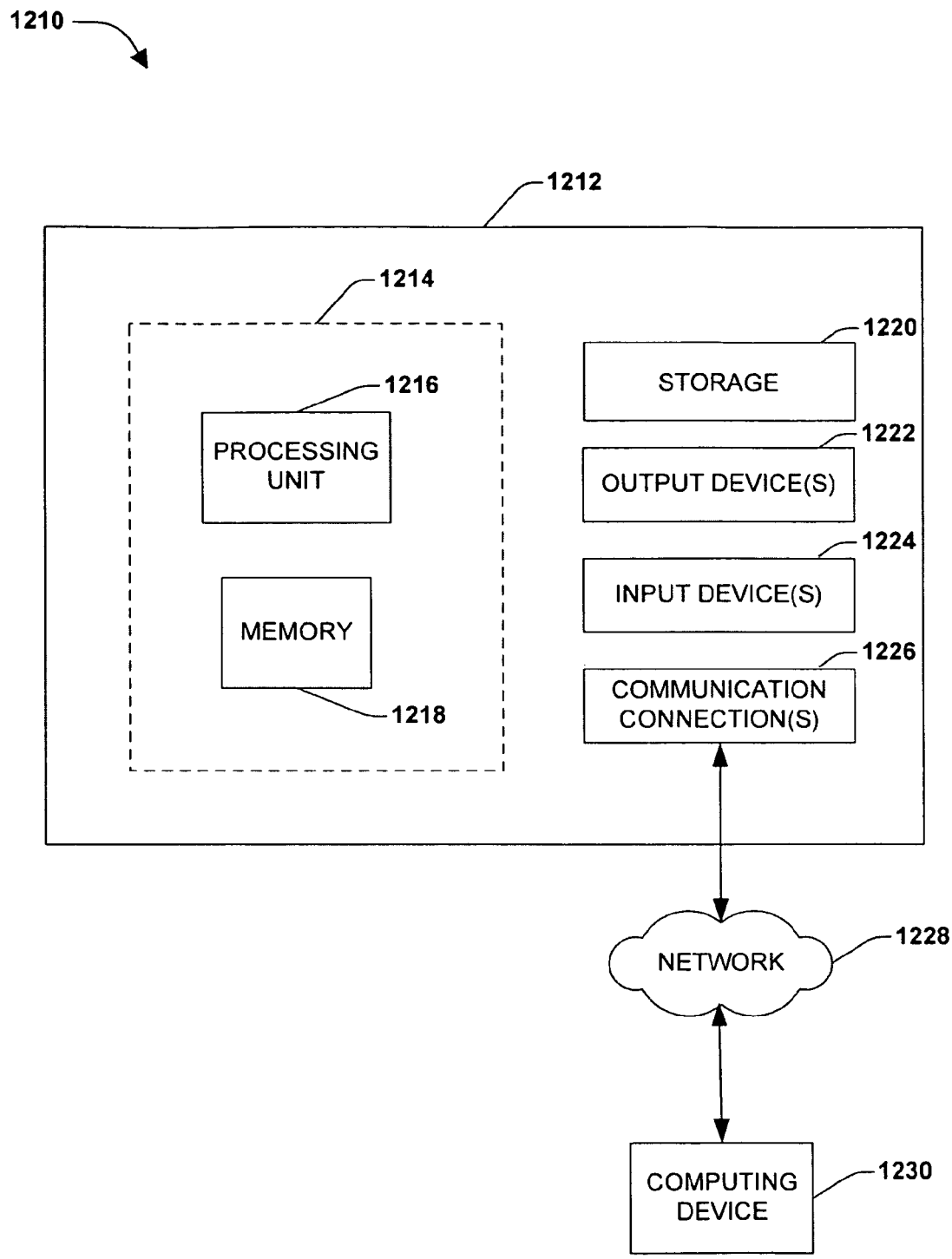
FIG. 12 illustrates an exemplary computing environment wherein one or more of the provisions set forth herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 1210 comprising a computing device 1212 configured to implement one or more embodiments provided herein. In one configuration, computing device 1212 includes at least one processing unit 1216 and memory 1218. Depending on the exact configuration and type of computing device, memory 1218 may be volatile (such as RAM, for example), non-volatile (such as ROM, flash memory, etc., for example) or some combination of the two. This configuration is illustrated in FIG. 122 by dashed line 1214.

In other embodiments, device 1212 may include additional features and/or functionality. For example, device 1212 may also include additional storage (e.g., removable and/or non-removable) including, but not limited to, magnetic storage, optical storage, and the like. Such additional storage is illustrated in FIG. 122 by storage 1220. In one embodiment, computer readable instructions to implement one or more embodiments provided herein may be in storage 1220. Storage 1220 may also store other computer readable instructions to implement an operating system, an application program, and the like. Computer readable instructions may be loaded in memory 1218 for execution by processing unit 1216, for example.

The term "computer readable media" as used herein includes computer storage media. Computer storage media includes volatile and nonvolatile, removable and non-removable media implemented in any method or technology for storage of information such as computer readable instructions or other data. Memory 1218 and storage 1220 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1212. Any such computer storage media may be part of device 1212.

Device 1212 may also include communication connection(s) 1226 that allows device 1212 to communicate with other devices. Communication connection(s) 1226 may include, but is not limited to, a modem, a Network Interface Card (NIC), an integrated network interface, a radio frequency transmitter/receiver, an infrared port, a USB connection, or other interfaces for connecting computing device 1212 to other computing devices. Communication connection(s) 1226 may include a wired connection or a wireless connection. Communication connection(s) 1226 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1212 may include input device(s) 1224 such as keyboard, mouse, pen, voice input device, touch input device, infrared cameras, video input devices, and/or any other input device. Output device(s) 1222 such as one or more displays, speakers, printers, and/or any other output device may also be included in device 1212. Input device(s) 1224 and output device(s) 1222 may be connected to device 1212 via a wired connection, wireless connection, or any combination thereof. In one embodiment, an input device or an output device from another computing device may be used as input device(s) 1224 or output device(s) 1222 for computing device 1212.

Components of computing device 1212 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1212 may be interconnected by a network. For example, memory 1218 may be comprised of multiple physical memory units located in different physical locations interconnected by a network.

Those skilled in the art will realize that storage devices utilized to store computer readable instructions may be distributed across a network. For example, a computing device 1230 accessible via network 1228 may store computer readable instructions to implement one or more embodiments provided herein. Computing device 1212 may access computing device 1230 and download a part or all of the computer readable instructions for execution. Alternatively, computing device 1212 may download pieces of the computer readable instructions, as needed, or some instructions may be executed at computing device 1212 and some at computing device 1230.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer implemented method for assisting a user in generating a desired phrase, comprising:
    obtaining a set of phrases for presentation as a function of one or more characters entered into a character entry field, at least one phrase within the set of phrases comprising more than one term;
    pinning one or more terms, but fewer than all terms, of a presented phrase, from the set of phrases, the pinned terms inserted into the character entry field; and
    temporarily replacing one or more pinned terms in the character entry field, but fewer than all pinned terms, with a placeholder when a second set of phrases, obtained based at least in part upon the pinned terms, comprises fewer than a desired number of phrases.

2. The method of claim 1, the obtained set of phrases respectively comprising a term that begins with the one or more characters entered into the character entry field.

3. The method of claim 1, the second set of phrases comprising phrases comprising at least one of the pinned terms.

4. The method of claim 1, comprising:
    receiving user input indicative of an entry of one or more characters after the pinned one or more terms; and
    obtaining for presentation the second set of phrases based at least in part upon the user input.

5. The method of claim 1, comprising distinguishing one or more terms of a phrase presented in the set of phrases differently than other terms in the phrase, the distinguished one or more terms indicative of terms that may be pinned.

6. The method of claim 1, respective phrases of the second set of phrases beginning with at least one of the pinned terms.

7. The method of claim 1, comprising obtaining a third set of phrases as a function of one or more pinned terms not replaced by the placeholder.

8. A system for assisting a user in generating a desired phrase, comprising:
    one or more processors configured to execute computer readable instructions to implement the system;
    an acquisition component configured to obtain a set of phrases for presentation as a function of one or more characters entered into a character entry field, at least one phrase within the set of phrases comprising more than one term;
    a pinning component configured to pin one or more terms, but fewer than all terms, of a presented phrase, from the set of phrases, the pinned terms inserted into the character entry field; and
    a substitution component configured to temporarily replace one or more pinned terms in the character entry field, but fewer than all pinned terms, with a placeholder when a second set of phrases, obtained by the acquisition component based at least in part upon the pinned terms, comprises fewer than a desired number of phrases.

9. The system of claim 8, the acquisition component configured to obtain a third set of phrases as a function of one or more pinned terms not replaced by the placeholder.

10. The system of claim 9, the acquisition component configured to combine the pinned terms, including terms temporarily replaced by the placeholder, with the third set of phrases prior to a presentation of the third set of phrases, the substitution component configured to replace the placeholder with the pinned terms that were temporarily replaced with the placeholder when the pinned terms are combined with the third set of phrases.

11. The system of claim 10, the acquisition component configured to obtain phrases that comprise one or more terms that cannot be part of the desired phrase given the temporarily replaced terms that replace the placeholder and the substitution component configured to disregard the one or more terms that cannot be a part of the desired phrase.

12. The system of claim 8, the substitution component configured to temporarily replace one or more characters input by a user with the placeholder.

13. The system of claim 8, the acquisition component configured to join the pinned terms to the obtained second set of phrases.

14. The system of claim 8, the acquisition component configured to join the pinned terms, including terms temporarily replaced by the placeholder, to the obtained second set of phrases.

15. A computer readable storage medium comprising computer executable instructions that when executed via a processor perform a method, the method comprising:

obtaining a set of phrases for presentation as a function of one or more characters entered into a character entry field, at least one phrase within the set of phrases comprising more than one term;

pinning one or more terms, but fewer than all terms, of a presented phrase, from the set of phrases, the pinned terms inserted into the character entry field; and temporarily replacing one or more pinned terms in the character entry field, but fewer than all pinned terms, with a placeholder when a second set of phrases, obtained based at least in part upon the pinned terms, comprises fewer than a desired number of phrases.

16. The computer readable storage medium of claim 15, the obtained set of phrases respectively comprising a term that begins with the one or more characters entered into the character entry field.

17. The computer readable storage medium of claim 15, the second set of phrases comprising phrases comprising at least one of the pinned terms.

18. The computer readable storage medium of claim 15, comprising obtaining a third set of phrases as a function of one or more pinned terms not replaced by the placeholder.

19. The computer readable storage medium of claim 15, comprising:

receiving user input indicative of an entry of one or more characters after the pinned one or more terms; and obtaining for presentation the second set of phrases based at least in part upon the user input.

20. The computer readable storage medium of claim 15, comprising distinguishing one or more terms of a phrase presented in the set of phrases differently than other terms in the phrase, the distinguished one or more terms indicative of terms that may be pinned.

* * * * *